Dec. 23, 1941.    S. T. VAN HOUTEN    2,267,484
FIRE DETECTING AND SIGNALING UNIT
Filed Jan. 19, 1940    2 Sheets-Sheet 1

INVENTOR
Stephen T. Van Houten
BY
Townsend & Decker
ATTORNEYS

Dec. 23, 1941.  S. T. VAN HOUTEN  2,267,484
FIRE DETECTING AND SIGNALING UNIT
Filed Jan. 19, 1940   2 Sheets-Sheet 2

INVENTOR
Stephen T. Van Houten
BY
Townsend & Decker
ATTORNEYS

Patented Dec. 23, 1941

2,267,484

UNITED STATES PATENT OFFICE 2,267,484

FIRE DETECTING AND SIGNALING UNIT

Stephen T. Van Houten, Allendale, N. J., assignor to Lowe Laboratories, Inc., New York, N. Y., a corporation of New Jersey Application January 19, 1940, Serial No. 314,622

13 Claims. (Cl. 200—140)

This invention has for its principal object the production of a small and compact unit of simple construction adapted to be installed at spaced intervals on the ceiling, and in some cases on the side walls, of a room or other enclosure and which shall be responsive to the action of excessive heat, such as that generated by a fire, to automatically energize a signal either audible or visible.

A further object of the invention is the production of a unit having the above characteristics which shall be so constructed that it will operate automatically and faithfully either on the principle or the sudden expansion of a confined body of air when heated, said principle being known in the art as the "rate-of-rise" principle or on the principle of the attainment of a fixed and predetermined temperature and further, one which will operate on both of said principles.

A further object of the invention is the production of a device of the above character in which the "rate-of-rise" element may be expeditiously attached or detached from the unit without the employment of screws or other fastening means so that, when detached from the unit, the unit will operate on the fixed temperature principle only but, on the other hand, when attached to the unit, the unit will operate either on both on the "rate-of-rise" of temperature principle as well as on the fixed temperature principle, or on the "rate-of-rise" of temperature principle alone. In other words, the invention contemplates the combination in one unit of separate methods of heat detection, to wit, that based on the "rate-of-rise" of temperature, that based on the attainment of a fixed temperature or that based on both of them, the invention including detachable and adjustable features or elements which permit in the one unit the use of any one of the three methods as may be desired.

A further object of the invention is the production of a unit of the general character previously described which shall be so constructed as to automatically re-adjust or restore itself to normal position after operation thus making unnecessary the replacement of parts to thereby appreciably decrease or minimize the expense of maintenance. It has been proposed, for instance, in some cases to employ a fusible element in somewhat analogous devices which must fuse to complete a circuit when the device operates on the fixed temperature principle and which thereafter must be replaced or renewed. In the present case, however, I dispense entirely with such fusible element, or any equivalent thereof, and as above stated, after operation, I permit the unit to adjust itself automatically after operation and to restore itself to its original or initial position.

Other and further objects of the invention will be apparent from the subjoined description, the invention consisting in the novel unit and parts thereof hereinafter more particularly described and then specified in the claims.

In the accompanying drawings illustrating a practical embodiment of the invention:

Figure 13:
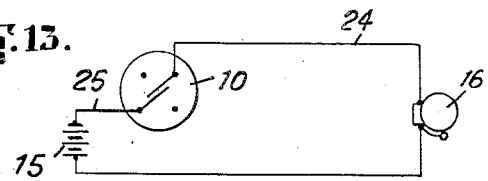
Figure 14:
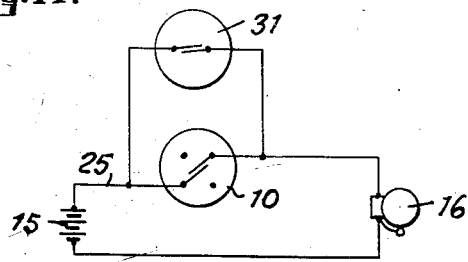

Fig. 13 is a similar view when the device operates on the fixed temperature principle only, and Fig. 14 is a diagrammatic view of the electrical connections when the device operates on either the rate-of-rise principle or the fixed temperature principle or both, two circuits being shown for the purpose of clarity, although, it will be understood, one circuit only is employed when the unit is used commercially.

Referring in detail to the several figures of the drawings:

The unit preferably includes an annular box-like supporting body which is indicated at 10, its outer face or wall 11 being provided with bayonet slots 12 for a purpose to be hereinafter described. Said body may be composed of any suitable insulating material and it is provided with perforated ears 13 for detachably securing it to the ceiling or walls of a room. It is also provided with suitable openings 14 for the admission of air and for the reception of conducting wires to be connected to a source of power, as a battery 15 and a signal, such as bell 16. The outer face is also provided with a depression 17 while the inner annular 18 face of the box-like body may comprise a removable plate seated in an annular shoulder 19 with which the body is provided and frictionally held on said shoulder or otherwise detachably and conveniently held to the body.

Fastened to the inner side of the outer wall 11 of the box-like body are the metallic contact strips 20 and 21 comprising circuit terminals to which are secured, preferably by riveting or soldering or otherwise, the curved metallic spring contacts 22 and 23 respectively and forming parts of said terminals. One of these contact strips is connected, as by conductor 24, to the bell 16, and thence to the battery 15 while the other is connected by conductor 25 to the battery 15. Also one of said contacts, as contact 21, has fastened to an extension 26 thereof, as by pivot screw 27, a bimetallic strip 28 of planished metal and composed of two separate metal strips united together by riveting or brazing and having different coefficients of expansion. The screw 27 also carries a stop 29 to limit the movement of the strip 28 upwardly when cooling and after having been subjected to the influence of heat when it assumes its original position.

The bent end of the bimetallic strip 28 is adapted to engage an angled extension 30 fastened or secured in any manner to contact strip 22 to complete the circuit through conductor 24, bell 16, battery 15 and conductor 25 thereby energizing bell 16 to sound a signal. This contact between the bent end of strip 28 and the angled extension 30 is effected when heat of a predetermined degree and of sufficient intensity, as that occasioned by a fire, has been generated to cause the bimetallic strip to bend downwardly automatically and make such contact. The device, thus, in this instance, operates on the principle of the attainment of a fixed and predetermined temperature. Upon cooling, the strip 28 automatically contracts and bends upwardly to restore itself to its original position, its movement being limited by stop 29, and contact between its end and extension 30 is thereby broken to break the circuit. After the strip 28 has assumed its initial position it is ready to function again immediately when occasion arises and without the necessity of replacements of parts or of the setting or manipulation of parts.

The annular flanged base of an air chamber is indicated at 31 and it is composed of any suitable insulating material. Secured thereto by the screws 32 are the current conducting angled prongs 33. A contact post in the form of a screw 34 is centrally mounted on the base 31 and is held in adjustable position therein by means of upper and lower washers 35 and nut 36. A metallic connecting strip 37 connects the left-hand screw 32 and contact screw 34 and is preferably interposed at an end thereof between the base 31 and lower washer 35. Air relief or equalizer openings 38 are provided in said base 31 as indicated.

Figure 1:
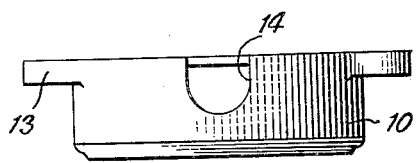
Fig. 1 is a side elevation of the body of the device.
Figure 3:
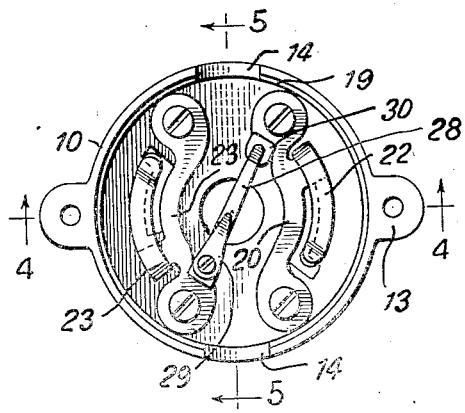
Fig. 3 is a bottom plan view thereof.
Figure 2:
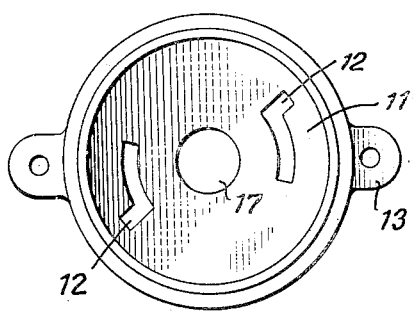
Fig. 2 is a top plan view thereof.
Figure 4:
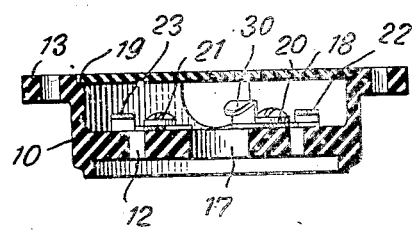
Fig. 4 is a horizontal section on the line 4—4 of Figure 3.
Figure 5:
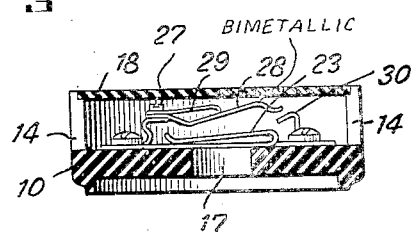
Fig. 5 is a vertical cross-section on the line 5—5 of Figure 3.
Figure 6:
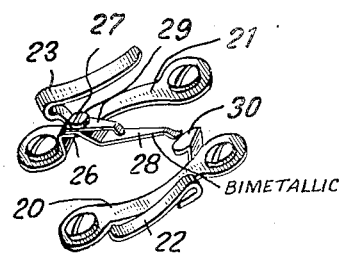
Fig. 6 is a perspective view of the interior mechanism of the body shown in Figure 3.
Figure 7:
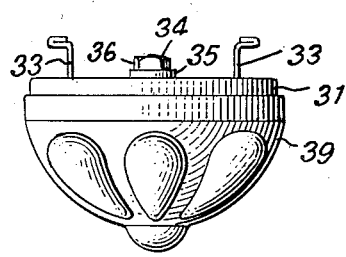
Fig. 7 is a side elevation of the "rate-of-rise" of temperature chamber.
Figure 9:
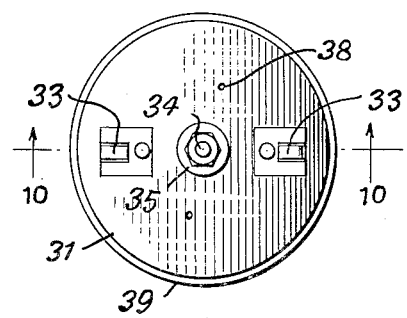
Fig. 9 is a bottom plan view thereof.
Figure 8:
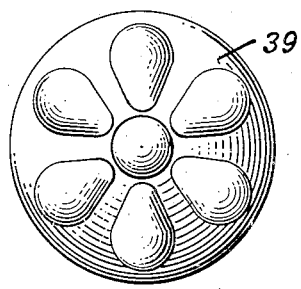
Fig. 8 is a top plan view.
Figure 10:
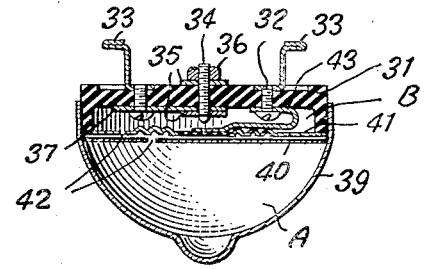
Fig. 10 is a horizontal section on the line 10—10 of Figure 9.
Figure 11:
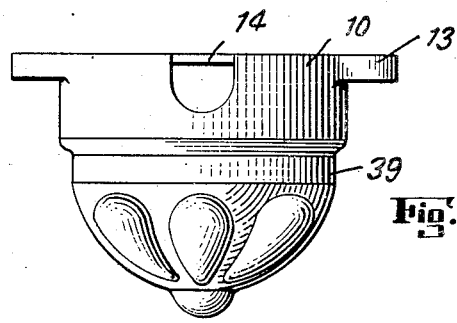
Fig. 11 is a side elevation of the complete unit showing the "rate-of-rise" chamber detachably secured to the body.
Figure 12:
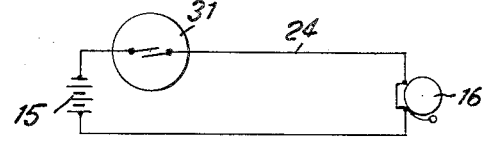
Fig. 12 is a diagram of the electrical connections when the device operates on the "rate-of-rise" principle only.

A hollow shell, semi-spherical in form, and composed of thin metal is indicated at 39. This shell may be slipped over the downwardly depending flange of the base 31 and frictionally held thereto as indicated in Figure 10. An annular supporting plate 40 is mounted in said shell and may be fastened thereto in any desirable manner. Said plate 40 supports a thin, flexible and preferably metallic diaphragm 41 which may be corrugated and the edge of which is held intermediate the plate 40 and the lower edge of the flange of the base 31. The plate 40 and the diaphragm 41 provide with the base 31 and shell 39 two air chambers which have been designated as A and B, chamber A being a "rate-of-rise" air chamber and chamber B being a "relief" chamber. The plate 40 and diaphragm 41, moreover, are both provided with a plurality of "breather" air vents or openings 42 whereby both chambers are normally at atmospheric air pressure. Gradual or normal changes in temperature, accordingly, will be compensated for with the air pressure in both chambers A and B equalized because of the inclusion of the breather openings 42 and equalizer openings 38. A spring metallic strip 43 is carried by the right-hand screw 32 and it engages the upper side of the diaphragm 41. It has the dual function of acting to retain said diaphragm in engagement with the plate 40 and normally disengaged from contact post 34 and of forming the part of an electrical circuit to be described.

The operation of the unit, when it functions on the fixed temperature principle, has heretofore been explained and when it so operates the base 31 with attached air chambers and other parts and connections described forming the rate-of-rise element of the unit are separated from and form no part of the unit. The rate-of-rise element may be attached to and become a part of the unit, however, by inserting the angled prongs 33 within the enlarged portions of the bayonet slots 12 and then rotating said rate-of-rise element to detachably lock the same to the body 10 of the unit, as is obvious. When so locked to the body the angled ends of the prongs 33 frictionally engage the metallic spring contacts 22 and 23 and the end of contact post or screw 34 and the nut 36 are received by the depression 17. The unit is then ready to operate on either the fixed temperature principle or the rate-of-rise principle.

When the unit operates on the rate-of-rise principle a sudden rise in temperature brought about, for instance by a fire, acts to expand the air in chamber A to an extent wherein the expanded air cannot be accommodated by the breather openings 42 and relief openings 38 in which case the force of the expanded air will exert pressure against diaphragm 41 to distend said diaphragm upwardly against the action of spring strip 43. This action, manifestly, results in electrically bridging the contact screw or post 34 and the right-hand prong 33 as, in the embodiment shown, said spring strip is forced by the diaphragm into engagement with the lower end of contact screw 34 to thereby close the electrical circuit and energize the signal 16. Obviously, the current will flow from the battery 15 to one of the spring contacts 22 or 23 through the connecting strip 37, contact screw 34, spring metallic strip 43, the other of said spring contacts 22 or 23, through the signal 16 and back to the battery.

When it is desired to have the unit function only on the rate-of-rise of temperature principle and not on the attainment of a fixed temperature, the pivot screw 27 is loosened and the bimetallic strip 28 is swung out of alignment with the angled extension 30 so that even though should said bimetallic strip expand under the action of heat its end will not be brought into automatic contact with the angled extension 30 to close the circuit but will expand downwardly at one side thereof, as will be apparent.

It will be understood that the invention is not limited to the precise system of wiring and electrical connections with the battery and signal and as specifically described but various modifications may be resorted to and as will be obvious to an electrician or to others skilled in the art, without departing from the spirit of the invention as set forth in the appended claims.

It will be further understood that in lieu of or in addition to the signal described herein which is energized by the closing of the circuit when the unit is subjected to the action of heat, I may include in the circuit any other energizable device or object useful, as an example, in a fire extinguishing and control system or apparatus for opening the sprinkler heads, for instance, or for opening the main control valve in the system to permit the flow of the fire extinguishing medium thereto.

The invention claimed is:

1. A heat detecting and signaling unit comprising a supporting body having openings therein, electrical terminals thereon for electrical connection with a source of current supply and an energizable device, a circuit closer comprising a bimetallic strip of metal connected to one of said terminals and mounted in operative position with respect to the other of said terminals and adapted to automatically bend itself into engagement with said other terminal when subjected to the influence of heat of a predetermined degree to close the circuit and energize the device and to assume its initial position upon cooling, means mounting said bimetallic strip for movement from its operative position with respect to said other terminal to render said strip inoperative, and a second circuit closer having conductors extending through the openings in the supporting body and detachably engaging the electrical terminals thereon and provided with circuit-closing means responsive to an abnormal rate of rise in temperature for connecting the conductors together.

2. A heat detecting and signaling unit comprising a supporting body having openings therein, electrical terminals thereon for electrical connection with a source of current supply and an energizable device, a circuit closer comprising a bimetallic strip of metal pivotally connected to one of said terminals and adapted to be automatically brought into contact with the other terminal when subjected to the influence of heat of a predetermined degree to close the circuit and energize the device and to assume its initial position upon cooling, a stop for limiting the movement of said bimetallic strip in its return from circuit closing to initial position, and a second circuit closer having conductors extending through the openings in the insulating body and provided with circuit-closing means responsive to an abnormal rate of rise in temperature for connecting the conductors together.

3. A heat detecting and signaling unit comprising a supporting body, electrical terminals thereon for electrical connection with a source of current supply and an energizable device, a movable and self-restoring switch element connected to one of said electrical terminals and responsive to the action of heat of a predetermined degree for automatically connecting said electrical terminals together to close the circuit and energize the device, a second supporting body detachably connected to the first-named supporting body and provided with circuit-closing means responsive to an abnormal rate of rise in temperature for also closing the circuit to energize the signal.

4. A heat detecting and signaling unit comprising a supporting body provided with openings therein and having a pair of metallic terminals mounted thereon for electrical connection with a source of current supply and an energizable device, a movable and self-restoring switch element responsive to the action of heat of a predetermined degree for automatically bridging said terminals to close the circuit and energize the device and a second supporting body provided with a pair of conductors extending through said openings and detachably and frictionally engaging said terminals, said second supporting body being provided with a switch including a flexible member movably responsive to an abnormal rate of rise in temperature for electrically connecting the conductors together.

5. A heat detecting and signaling unit comprising a supporting body having a pair of metallic retaining and conducting terminals thereon for electrical connection with a source of current supply and an energizable device, a self-restoring switch element responsive to the action of heat of a predetermined degree for automatically bridging the terminals to close the circuit and energize the device and a second supporting body adapted to be connected with and disconnected from the first-named body and having fastening conductors to detachably and electrically engage said terminals, said second supporting body being provided with a circuit-closing switch including a member responsive to an abnormal rate of rise in temperature for connecting the conductors together.

6. A heat detecting and signaling unit comprising a supporting body having a pair of metallic terminals thereon for electrical connection with a source of current supply and an energizable device, a self-restoring switch element on said body responsive to the action of heat of a predetermined degree for automatically bridging the terminals to close the circuit and energize the device, a second supporting body provided with a pair of conductors detachably connecting said supporting bodies and engaging said terminals, a shell connected with the second supporting body and forming an air chamber, and a switch in said chamber including a flexible member responsive to an abnormal rate of rise in temperature for connecting the conductors together.

7. A heat detecting and signaling unit comprising a supporting body having a pair of metallic terminals thereon for electrical connection with a source of current supply and an energizable device, a movable and automatically self-restoring switch member on said body responsive to the action of heat of a predetermined degree for automatically bridging the terminals to close the circuit and energize the device, and a second supporting body provided with quickly detachable connecting means for frictionally engaging said terminals to connect the supporting bodies and terminals and with a heat-responsive circuit-closing means comprising a switch element and a diaphragm responsive only to an abnormal rate of rise in temperature to also bridge the terminals and close the circuit.

8. A heat detecting and signaling unit comprising a supporting body, a pair of terminals mounted thereon for electrical connection with a source of current supply and an energizable device, an air chamber mounted on said body, a supporting element associated therewith and having an opening therein, a flexible diaphragm normally engaging said supporting element and adapted to be distended by the expansion of air in said chamber under the influence of heat, a spring element normally exerting pressure against said diaphragm to hold it in engagement with said supporting element and acting to electrically bridge said terminals upon distension of said diaphragm to close the circuit and energize the device and means associated with one of the terminals and responsive to the action of heat and acting independently of the expansion of air in said chamber to also bridge the terminals and close the circuit.

9. A heat detecting and signaling unit comprising a supporting body, a pair of terminals mounted thereon for electrical connection with a source of current supply and an energizable device, a contact post mounted on said body and electrically connected to one of said terminals, an air chamber secured to said body, a plate mounted therein, a flexible diaphragm supported by said plate and adapted to be distended upon the expansion of air in said chamber under the influence of heat, a spring strip connected to the other of said terminals and normally exerting pressure against said diaphragm to hold it in engagement with said plate and in spaced relation to said post and acting as an electrical conductor between said post and other terminal to energize the device upon distension of said diaphragm against the action of said spring strip and means associated with said chamber and acting independently of the expansion of air therein and responsive to the action of heat to automatically bridge the terminals and also energize the device.

10. A heat detecting device comprising a supporting body provided with a pair of metallic terminals for electrical connection with a circuit to be energized and also provided with a self-restoring circuit closing switch responsive to the action of heat of a predetermined degree to connect said terminals, a second supporting body provided with a pair of metallic terminals for electrical connection with said circuit and also provided with a self-restoring circuit closing switch responsive only to an abnormal rate of rise in temperature to connect said terminals, and means for detachably and frictionally connecting said bodies and terminals to adapt the unit to function through either circuit closing switch when the bodies are connected or to adapt the second-named supporting body to be quickly detached from the first-named supporting body to permit the unit to function by the operation of the first-named closing switch only, at the will of the operator.

11. A heat detecting device comprising a supporting body provided with a pair of metallic terminals for electrical connection with a circuit to be energized and also provided with a self-restoring circuit closing switch responsive to the action of heat of a predetermined degree to connect said terminals, said switch being adjustable to an operative or inoperative position, a second supporting body provided with a pair of metallic terminals for electrical connection with said circuit and also provided with a self-restoring circuit closing switch responsive only to an abnormal rate of rise in temperature to connect said terminals, and means for detachably and frictionally connecting said bodies and terminals to adapt the unit to function through either switch when the bodies are connected or to function through the second-named switch when the first-named switch is rendered inoperative, or to adapt the second-named supporting body to be quickly detached from the first-named supporting body to permit the unit to function by the operation of the first-named circuit closing switch only, at the will of the operator.

12. A heat detecting unit for controlling an electric circuit provided with terminals and containing an energizable device, comprising a pair of cooperable switch devices, one of said switch devices being adapted to be connected with the terminals of the circuit to be energized and embodying a self-restoring circuit closing switch operating at a predetermined fixed temperature to close the circuit, and the other of said switch devices embodying a self-restoring switch operating on the rate of rise principle to close said circuit on an abnormal rate of rise in temperature, said switch devices being provided with quick detachable connections to couple them for coaction and to normally permit the unit to function on both principles of operation and to adapt them to be disconnected to permit the unit to function through said first-named switch device on the fixed temperature principle only.

13. A heat detecting unit comprising a supporting body with a pair of terminals mounted thereon for electrical connection with a circuit to be energized, an air chamber connected to said body, a supporting element associated with said chamber and provided with an opening therein, a flexible diaphragm normally engaging said supporting element and adapted to be distended under pressure of the expanded air in said chamber responsive to the action of heat, a spring element exerting pressure against said diaphragm to normally hold it in engagement with said supporting element and acting to electrically bridge said terminals upon distension of said diaphragm under pressure and heat-responsive means included in the unit but inert to the pressure of air in said chamber and active under the influence of heat of a predetermined degree to also electrically bridge said terminals.

STEPHEN T. VAN HOUTEN.